(12) United States Patent
Lawrence et al.

(10) Patent No.: US 7,675,999 B2
(45) Date of Patent: Mar. 9, 2010

(54) MULTICARRIER RECEIVER AND METHOD WITH PHASE NOISE REDUCED SIGNAL

(75) Inventors: Sean J. Lawrence, Karnataka (IN); Ashim Biswas, Karnataka (IN); Anees A. Sahib, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 938 days.

(21) Appl. No.: 11/377,958

(22) Filed: Mar. 16, 2006

(65) Prior Publication Data

US 2007/0218854 A1 Sep. 20, 2007

(51) Int. Cl.
*H04L 27/00* (2006.01)
(52) U.S. Cl. .................................. 375/326
(58) Field of Classification Search .......... 375/260, 375/332, 340–341, 346, 226, 279, 330, 227, 375/254, 278, 284–285, 326; 455/63, 139, 455/255–256, 257, 310, 63.1; 370/208, 57, 370/281, 295, 302, 342–344, 480–481, 69.1, 370/120, 299, 335, 436, 441, 478; 329/307, 329/318–320, 349, 351, 358, 360, 361, 306
See application file for complete search history.

(56) References Cited

U.S. PATENT DOCUMENTS

| | | | | |
|---|---|---|---|---|
| 5,109,532 A | * | 4/1992 | Petrovic et al. | ............ 455/63.1 |
| 5,838,734 A | * | 11/1998 | Wright | ....................... 375/316 |
| 5,930,306 A | * | 7/1999 | Boie | ......................... 375/332 |
| 5,970,397 A | * | 10/1999 | Klank et al. | ................ 455/139 |
| 6,246,717 B1 | * | 6/2001 | Chen et al. | ................... 375/226 |
| 6,304,545 B1 | * | 10/2001 | Armbruster et al. | ........ 370/210 |
| 6,980,589 B1 | * | 12/2005 | Babb et al. | .................. 375/222 |
| 7,321,641 B2 | * | 1/2008 | Moulthrop et al. | .......... 375/332 |
| 7,609,789 B2 | * | 10/2009 | Leshem | ...................... 375/346 |
| 2006/0176802 A1 | * | 8/2006 | Ko et al. | ..................... 370/208 |
| 2006/0203944 A1 | * | 9/2006 | Kwak et al. | ................. 375/343 |
| 2007/0002981 A1 | * | 1/2007 | Gaikwad et al. | ............ 375/346 |
| 2007/0133721 A1 | * | 6/2007 | Wallen et al. | ............... 375/346 |

FOREIGN PATENT DOCUMENTS

EP    0 933 903 A2 *  4/1999

OTHER PUBLICATIONS

Armada, Ana Garcia et al., "Phase Noise and Sub-Carrier Spacing Effects on the Performance of an OFDM Communication System," IEEE Communications Letters, vol. 2, No. 1, Jan. 1998, pp. 11-13.

(Continued)

*Primary Examiner*—Tesfaldet Bocure
*Assistant Examiner*—Lawrence B Williams
(74) *Attorney, Agent, or Firm*—Schwabe, Williamson & Wyatt, P.C.

(57) ABSTRACT

Various embodiments of methods and apparatus to remove or reduce phase noise in a baseband signal at a receiver are generally described herein. Other embodiments may be described and claimed.

30 Claims, 5 Drawing Sheets

OTHER PUBLICATIONS

Jianhua, Zhang et al., "Analysis of ICI Cancellation Scheme in OFDM Systems With Phase Noise," IEEE Transactions on Broadcasting, vol. 50, No. 2, Jun. 2004, pp. 97-106.

Petrovic, Denis et al., "Phase Noise Suppression in OFDM including Intercarrier Interference," Dresden University of Technology, Germany, 5 pgs, Aug. 11, 2003.

Robertson, Patrick et al., "Analysis of the Effects of Phase-Noise in Orthogonal Frequency Division Multiplex (OFDM) Systems," IEEE, 1995, pp. 1652-1657, Jun. 18-22, 1995.

Schenk, Tim C.W. et al., "Analysis of the Influence of Phase Noise in MIMO OFDM based WLAN systems," Proceedings Symposium IEEE Benelux Chapter on Communications and Vehicular Technology, Nov. 2003, paper 08, pp. 1-8.

* cited by examiner

MULTICARRIER RECEIVER AND METHOD WITH PHASE NOISE REDUCED SIGNAL

BACKGROUND

1. Technical Field

Embodiments of the present invention are related to the field of communication devices, and in particular, to multicarrier communication devices.

2. Description of Related Art

Many modern digital communication systems, including wireless local-area networks (WLANs), are using symbol-modulated orthogonal subcarriers as a modulation scheme to help signals survive in environments having multipath reflections and/or strong interference. Orthogonal frequency-division multiplexing (OFDM) is an example of a multicarrier transmission technique that uses symbol-modulated orthogonal subcarriers to transmit information within an available spectrum. A multiple access scheme based on the OFDM includes orthogonal frequency division multiple access (OFDMA). In OFDMA a subset of the entire set of orthogonal subcarriers is assigned to a particular user. This enables an OFDMA system to have multiple simultaneous users, each assigned to a different subset.

Phase noise may be interpreted as a random parasitic phase modulation in an oscillator's signal, which ideally would be a unique sinusoidal carrier with constant amplitude and frequency. A signal which is demodulated in the receiver station of a multicarrier system, such as an OFDM or OFDMA system, may have superimposed on it phase noise of all the local oscillators (LOs) in the chain between it and a modulator. Phase noise in OFDM and OFDMA systems basically have two effects: a phase error common to all OFDM subcarriers called the common phase error (CPE) and inter-carrier interference (ICI). ICI may be characterized as a spilling of the spectrum of subcarrier signals into adjacent subcarriers. The ICI component is a factor in limiting the use of higher order (Quadrature Amplitude Modulated) QAM constellations; hence, preventing achievement of higher data rates.

DETAILED DESCRIPTION OF ILLUSTRATIVE EMBODIMENTS

In the following description, for purposes of explanation, numerous details are set forth in order to provide a thorough understanding of the disclosed embodiments of the present invention. However, it will be apparent to one skilled in the art that these specific details are not required in order to practice the disclosed embodiments of the present invention. In other instances, well-known electrical structures and circuits are shown in block diagram form in order not to obscure the disclosed embodiments of the present invention.

Figure 1:
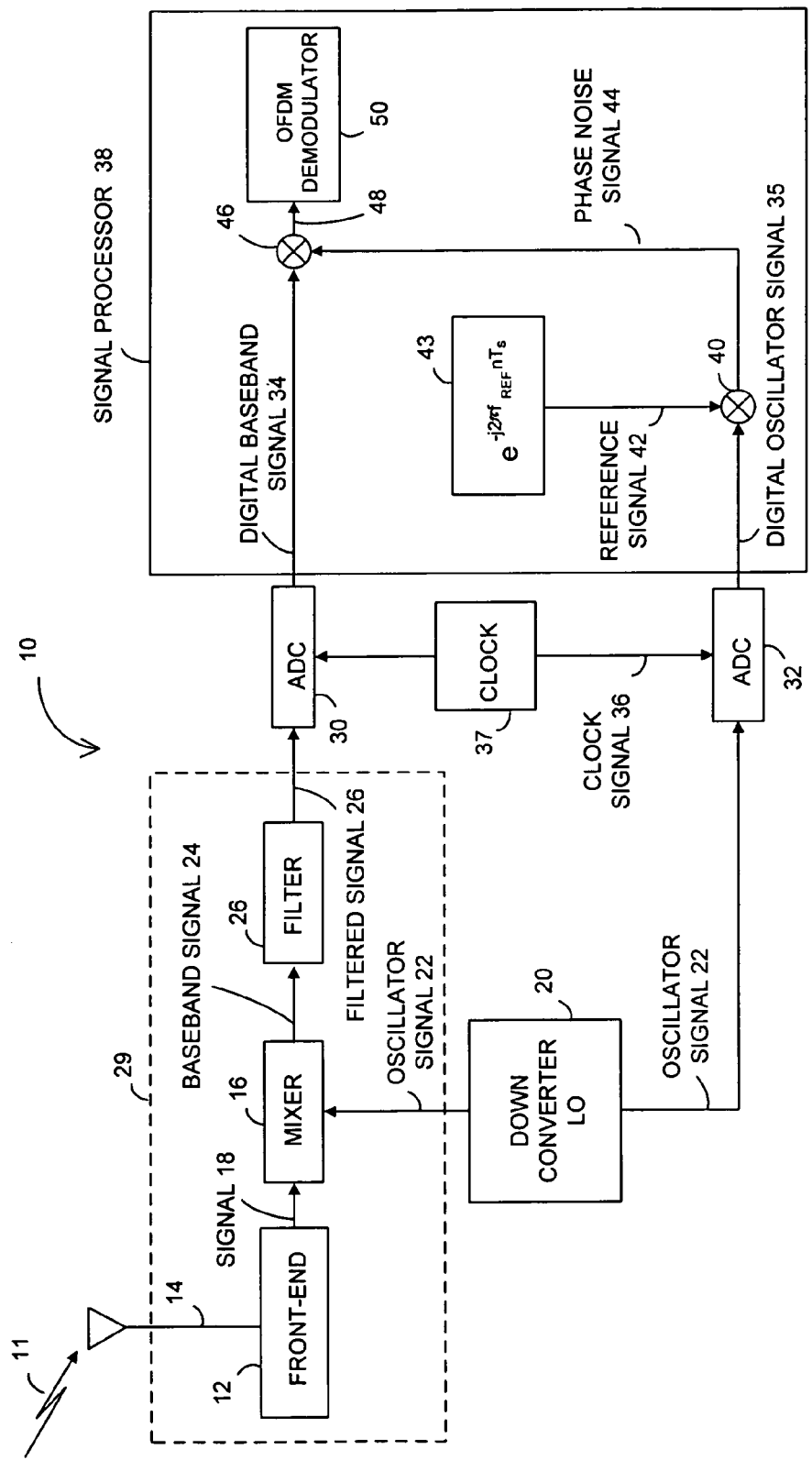
FIG. 1 is a block diagram of a multicarrier receiver, according to some embodiments of the present invention.

With reference to FIG. 1, there is illustrated a multicarrier receiver 10, according to some embodiments of the present invention, which may be part of a wireless communication device. In some embodiments, the receiver 10 may receive a communication signal in the form of a multicarrier communication signal, such as an OFDM communications signal. The term "OFDM communication signal" or "OFDM signal" may be an OFDMA signal in some embodiments and may not be an OFDMA signal in other embodiments. In other words, as used herein, the term "OFDM" is intended to be generic both to OFDM without OFDMA and OFDM with OFDMA, since OFDMA uses OFDM. In some embodiments, the received OFDM signal may be a radio frequency (RF) signal. The receiver 10, according to some embodiments of the present invention, is configured to substantially reduce or cancel the ICI and CPE components of phase noise introduced by oscillator instabilities at the receiver 10.

The receiver 10, in accordance with one embodiment of the present invention, may receive a multicarrier communication signal 11 with front-end circuitry 12. In some embodiments, the front end circuitry 12 may include an antenna 14, a band-pass filter (not shown) coupled to the antenna 14 to filter the communications signal, and a low-noise amplifier (not shown) coupled to the band-pass filter to amplify the communication signal. A mixer 16 (also referred to as a down-converter) may be coupled to the front-end circuitry 12 to receive a received multicarrier communication signal 18 and coupled to a down-converter local oscillator (LO) 20 adapted to receive an oscillator signal 22. In some embodiments, the oscillator 20 may be a voltage controlled oscillator (VCO). The mixer 16 may use the oscillator signal 22 to down-convert the received multicarrier communication signal 18 from the front-end circuitry 12 to a baseband signal 24. The baseband signal 24 is a complex analog signal. In some embodiments, a low-pass filter 26 may be coupled to the mixer 16 and may filter the baseband signal 24 provided by the mixer 16 so as to generate a filtered baseband signal 28. The low-pass filter 26 may provide a desired frequency band for a specific transmitting station (not shown). More specifically, the filtered baseband signal 28 may be an analog, down-converted, baseband, time domain, OFDM signal. The front-end circuit 12, the mixer 16, and the filter 26 may define RF circuitry 29, with the RF circuitry 29 receiving the multicarrier signal 11 and generating the baseband signal 28.

The receiver 10, according to one embodiment of the present invention, includes a pair of analog-to-digital converters (ADCs) 30 and 32 (also referred to as "samplers") coupled to the filter 26 and the oscillator 20, respectively, to receive the baseband signal 24 and the oscillator signal 22, respectively. The ADCs 30 and 32 sample these time domain analog signals, the baseband signal 24 and the oscillator signal 22, to generate a digital baseband signal 34 and a digital oscillator signal 35, respectively. In other words, the ADCs 30 and 32 may convert the analog signals into digital values (samples) that are discrete in time and amplitude. The ADCs 30 and 32 may use a common clock signal 36 from a clock 37 for their sampling. A signal processor 38, such as a digital signal processor (DSP), may be coupled to the ADCs 30 and 32 to receive the digital baseband and oscillator signals 34 and 35.

The signal processor 38 may include an operator 40, such as a multiplier, to combine the digital oscillator signal 35 with a reference signal 42 provided by a reference signal source 43, so as to remove the reference signal 42 from the digital oscillator signal 35 and to leave a phase noise signal 44. In other words, the operator 40, in response to the digital oscillator signal 35 and the reference signal 42, generates the phase noise signal 44. The reference signal 42 is based upon and is a function of a reference frequency $f_{REF}$, with the reference frequency $f_{REF}$ being an approximated or estimated frequency of the oscillator 20. The signal processor 38 may include another operator 46, such as a multiplier, for combining the digital baseband signal 34 with the phase noise signal 44 to remove or reduce phase noise from the digital baseband signal 34 so as to produce a phase noise reduced signal 48. In other words, the operator 46, in response to the digital baseband signal 34 and the phase noise signal 44, generates the phase noise reduced signal 48. The phase noise reduced signal 48 is provided to an OFDM demodulator 50, where the demodulator 50 may perform a fast Fourier transform on the phase noise reduced signal 48. In the OFDM, modulation in the transmitter may be achieved by an inverse fast Fourier transform (IFFT) and demodulation in the demodulator 50 may be achieved by a fast Fourier transform (FFT).

The receiver 10, according to one embodiment of the present invention, includes an ICI and CPE cancellation technique for receiver phase noise caused by the oscillator 20, with this cancellation technique substantially reducing or canceling this phase noise in time domain. More specifically, this cancellation technique involves sampling the oscillator signal 22 of the oscillator 20 at substantially the same instants as the baseband signal 28 is sampled. In some embodiments, this may be accomplished by incorporating the second ADC 32 and driving both ADCs 30 and 32 with the same clock, the clock 37. In other words, the same clock may be used by both ADCs 30 and 32 for sampling their respective analog signals. The oscillator signal 22 is sampled at the sampling rate of the baseband signal 28 to obtain the instantaneous phase of the oscillator signal 22 at those sampling instants. As phase noise is normally slowly varying, sampling at this frequency may be sufficient to obtain the desired phase noise process information. In some embodiments, this sampling rate would be 20 MHz.

Figure 2:
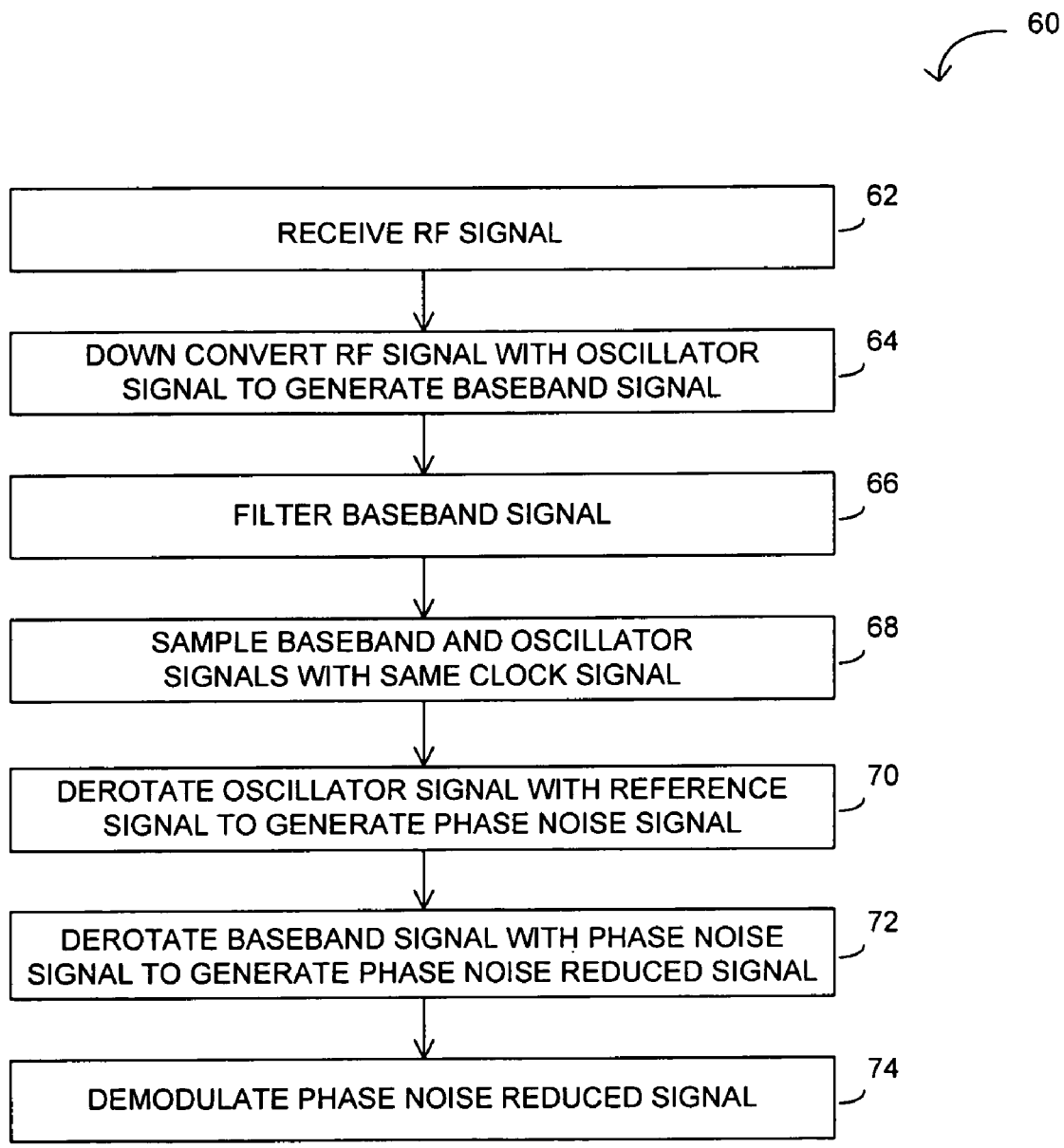
FIG. 2 is a flow chart for the multicarrier receiver of FIG. 1, according to some methods of the present invention.

The digital oscillator signal 35 may be represented as a two-dimensional vector, or phasor, in the complex plane, with the phasor having a frequency and a phase angle relative to a real axis of the complex plane. The phasor may also be expressed in an algebraic form as a complex number, as will be shown in the discussion of FIG. 2 provided hereinafter. The phasor of the digital oscillator 35 may visualize as being rotated in the complex plane by a frequency $f_{RX}$ and a phase angle, with the phase angle being the phase noise $\varnothing(t)$ introduced by the oscillator 20. In other words, the digital oscillator signal 35 samples have been rotated in the complex plane by the local oscillator's frequency $f_{RX}$ and therefore contain the same phase variation due to the phase noise, the phase noise $\varnothing(t)$, that affects the baseband signal 24.

The digital oscillator signal 35 samples are then processed by derotating them in the complex plane at the operator 40 by the reference signal 42. The reference signal 42 may be visualized as another phasor rotating in an opposite direction relative to the phasor of the digital oscillator signal 35. As previously described, the reference signal 42 has the reference frequency $f_{REF}$, with the reference frequency $f_{REF}$ being the approximated or estimated value of the frequency of the oscillator 20. This approximated value may be any value that is relatively close to the oscillator's frequency, such as the frequency specified in the manufacturer's specification for the oscillator 20.

The phase variation due to the phase noise $\varnothing(t)$ of the oscillator 20 is still contained in the digital baseband signal 34 samples and once extracted as part of the phase noise signal 44, may be used to cancel the phase noise $\varnothing(t)$ in the digital baseband signal 34 samples to produce the phase corrected signal 48; thereby substantially reducing or removing the effects of the phase noise $\varnothing(t)$ introduced by the oscillator 20 at the receiver 10. Again, this may be characterized as derotating the digital baseband signal 35 by the phase noise signal 44 using the operator 46. However, since the reference frequency $f_{REF}$ only approximates the oscillator's frequency $f_{RX}$, the phase noise signal 44 also introduces a frequency difference, a carrier frequency offset (CFO), into the digital baseband signal 44 that may be removed in a manner to be described hereinafter.

With reference to a flow chart 60 of FIG. 2 and with reference back to the block diagram of FIG. 1, a detailed mathematical presentation of the receiver 10, according to one embodiment of the invention, is now provided. In an operation 62 of FIG. 2, the received multicarrier communication signal 18 is received by the receiver 10 and may be described by the following equation:

$$y(t)e^{j(2\pi f_{TX}t+\theta(t))} \quad (1)$$

where, $y(t)=x(t)*h(t)$, $x(t)$ is the baseband time domain OFDM signal transmitted on a RF carrier of frequency $f_{TX}$, and $h(t)$ is the channel, $T_s$ is the sampling interval, $\theta(t)$ is the transmitter phase noise process and * denotes the convolution operation. In an operation 64, the received multicarrier communication signal 18 is down converted at the mixer 16 by using local oscillator 20 with frequency $f_{RX}$ and phase noise $\varnothing(t)$ results in the baseband signal 24. In an operation 66, the baseband signal 24 may be filtered by the filter 26 to generate the filtered baseband signal 28. In an operation 68, the filtered baseband signal 28 may be sampled with the ADC 30 so as to generate the digital baseband signal 34 samples:

$$w(n)=y(n)e^{j(2\pi(f_{TX}-f_{RX})nT_s+\theta(t)-\phi(n))} \quad (2)$$

Where $f_{TX}-f_{RX}$ is the carrier frequency offset (CFO), n is the time domain sample index, and $\varnothing(n)$ is the phase noise. The ADC 32 is driven by the same clock 37; hence, sampling of the oscillator signal 22 in the operation 68 results in the digital oscillator signal 35 samples:

$$r'(n)=e^{j(2\pi(f_{RX})nT_s+\phi(n))} \quad (3)$$

In an operation 70, the digital oscillator signal 35 samples then may be derotated at the operator 40 by the reference signal 42 (using reference frequency $f_{REF}$), where reference signal 42 is equal to $e^{-j2\pi f_{REF}nT_s}$, to obtain the phase noise signal 44 expressed by equation (4):

$$z(n)=e^{j(2\pi(f_{RX}-f_{REF})nT_s+\phi(n))} \quad (4)$$

Where, $f_{REF}\approx f_{RX}$. In an operation 72, the phase noise $\varnothing(n)$ may be removed or substantially reduced from the baseband digital baseband signal 34 samples, as shown by equations (2) and (4) by the operator 46, with the resulting phase noise reduced signal 48 being expressed by equation (5):

$$z(n)w(n)=y(n)e^{j(2\pi(f_{TX}-f_{REF})nT_s+\theta(t))} \quad (5)$$

The phase noise $\varnothing(t)$ is substantially reduced or cancelled from the resulting phase noise reduced signal 48 samples, as shown by equation (5). Although the phase noise reduced signal 48 samples obtained may still be affected by transmitter phase noise $\theta(t)$, they may be substantially free of the receiver phase noise $\varnothing(t)$ effects and may thereafter be further processed by the demodulator 50 for data recovery.

As also shown by Equation 5, the removal of the phase noise $\varnothing(t)$ from the phase noise reduced signal 48 samples by the operator 46 also rotates the samples by an introduced frequency offset rotation $2\pi(f_{TX}-f_{REF})^{nTS}$, with such rotation being caused by the introduced CFO (difference between reference frequency $f_{REF}$ and the frequency $f_{TX}$). This CFO may be estimated by any one of a number of CFO estimation techniques. For example, in one CFO estimation technique, a training signal may be received by the receiver 10 and the receiver 10 may determine a CFO estimate from the received training signal. In some embodiments, the amount of CFO compensation may be determined once from the training signal and thereafter repeatedly reused. In the operation 70, the CFO correction may be accomplished at the reference signal source 43 by replacing the reference frequency $f_{REF}$ with the reference frequency $f_{REF}$+CFO estimate. In an operation 74, the phase noise reduced signal 48 may be demodulated by the demodulator 50.

Referring back to FIG. 1, in some embodiments, the antenna 14 may comprise a directional or an omnidirectional antenna, including, for example, a dipole antenna, a monopole antenna, a loop antenna, a microstrip antenna or other type of antenna suitable for reception of received communication signals by the receiver 10. The single receive-signal path illustrated in FIG. 1 may be shown with an in-phase (I) channel component and a quadrature-phase (Q) channel component; however, by using complex algebraic notations, as shown by the associated mathematical equations, only one channel is illustrated. Hence, an in-phase and quadrature-phase mixers may be illustrated in place of the mixer 16, with the oscillator signal 22 being shifted in phase by substantially ninety degrees by a phase shifter. Likewise, there may be separate mixers 16, filters 26, and ADC 30s illustrated for the I and Q channels. Although only one oscillator 22 and one mixer 16 is shown, the down converting of the received multicarrier signal may be undertaken in multiple stages, for example, by generating an intermediate frequency signal.

Figure 3:
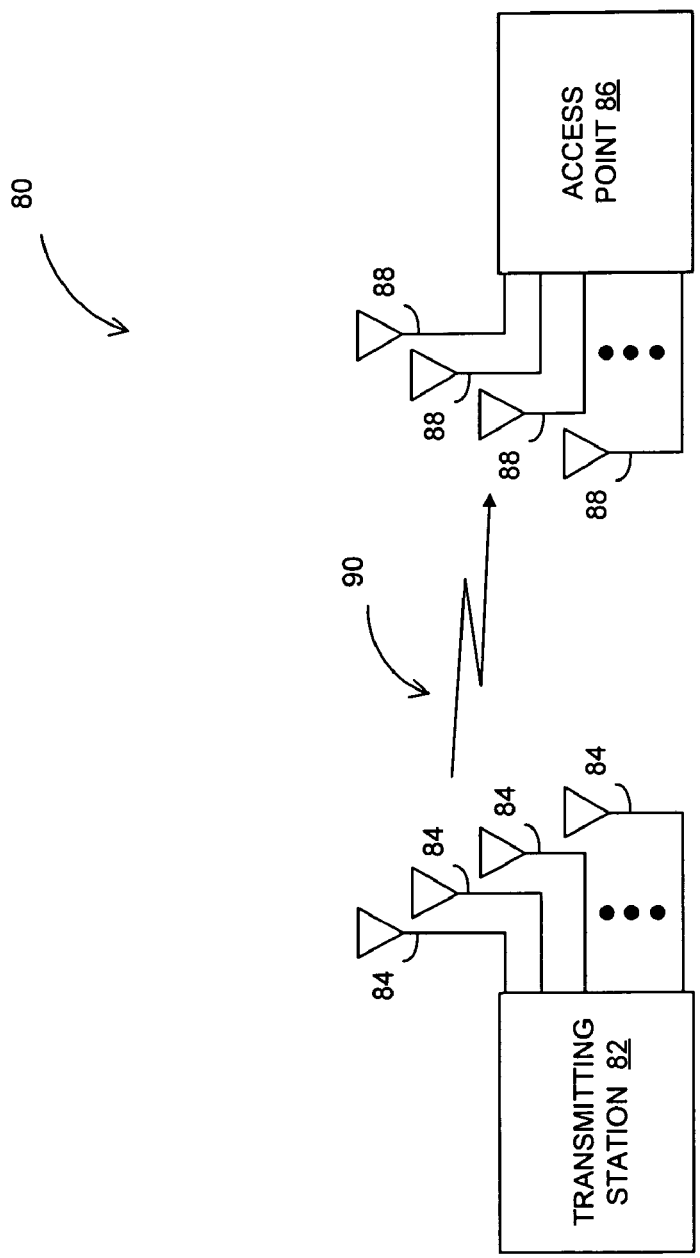
FIG. 3 is block diagram of a basic MIMO wireless network using the receiver of FIG. 1, according to some embodiments of the present invention.

The receiver 10 of FIG. 1 may be used in a network system described as a single-input, single-output (SISO) system where there is a single transmitting station communicating with a single receiver 10. The transmitting station may be referred to as an associated station. In some embodiments, the receiver 10 may be incorporated into an access point or base station, with the access point allowing the associated stations to have access to one or more external networks, such as the Internet. In some embodiments, the network system may be a basic multiple-input, multiple-output (MIMO) system using spatial multiplexing. This type of MIMO system may be referred as a "basic MIMO". FIG. 3 illustrates such a basic MIMO, as will now be discussed.

Referring to FIG. 3, in some embodiments, a network 80 may be arranged in a basic MIMO configuration, wherein uplink communications utilize: (a) a single transmitting station 82 having M antennas 84 and (b) a receiving access point 86 having at least M antennas 88, where M>1. For example, in the IEEE 802.11n, as identified hereinafter, M may be a maximum of 4. The M antennas at a given station 82 or access point 86 may be referred to as Multiple Element Antennas (MEAs) or array antennas. In other words, in the basic MIMO system, MEAs may be used at both ends of a wireless medium (wireless communication link) 90.

In the basic MIMO network 80, the receiver of the access point 86 may have M signal-receive paths. The number of receive antenna elements at the access point 86 may be at least as large as the number of data streams from the transmitting station 82. The receiver of the access point 86 may have each of the M receive-signal paths coupled to one of the M antennas 88. In some embodiments, the access point 86 may be a MIMO-OFDM capable access point.

The single transmitting station 82 may transmit M data streams via its M antennas 84 over the wireless medium 90. Spatial multiplexing may use the M antennas 84 at the transmitting station for transmitting M parallel data streams, with the parallel streams being generated from an original high-rate data stream. In some embodiments, the transmitting station may start transmissions with an IEEE 802.11n preamble. Although the network 80 may include multiple stations 82, the stations 82 sequentially upload packets to the access point 86; hence, only a single station 82 is transmitting at a time.

In this basic MIMO system, there is only one CFO to correct. Hence, the CFO estimation and correction, as described with respect to FIGS. 1 and 2 for the SISO implementation, also may be applied to the basic MIMO system. More specifically, in this basic MIMO system, the reference frequency $f_{REF}$ may be adjusted not only to correct for phase noise, but also to correct for frequency offset. In other words, the reference frequency $f_{REF}$ may be replaced by the reference frequency $f_{REF}$+CFO estimate in generating the reference signal (reference signal 42 in FIG. 1).

Referring to FIG. 3, when M=1, the basic MIMO system reduces to a SISO system. In some embodiments, the network 80 may be arranged in this SISO configuration, wherein uplink communications utilize: (a) a single transmitting station 82 having a single antenna 84 and (b) the receiving access point 86 using a single antenna 88 (although four antennas for each are shown in FIG. 3). In this SISO configuration, either the access point 86 or the single station 82 or both may incorporate the receiver 10 of FIG. 1.

Figure 4:
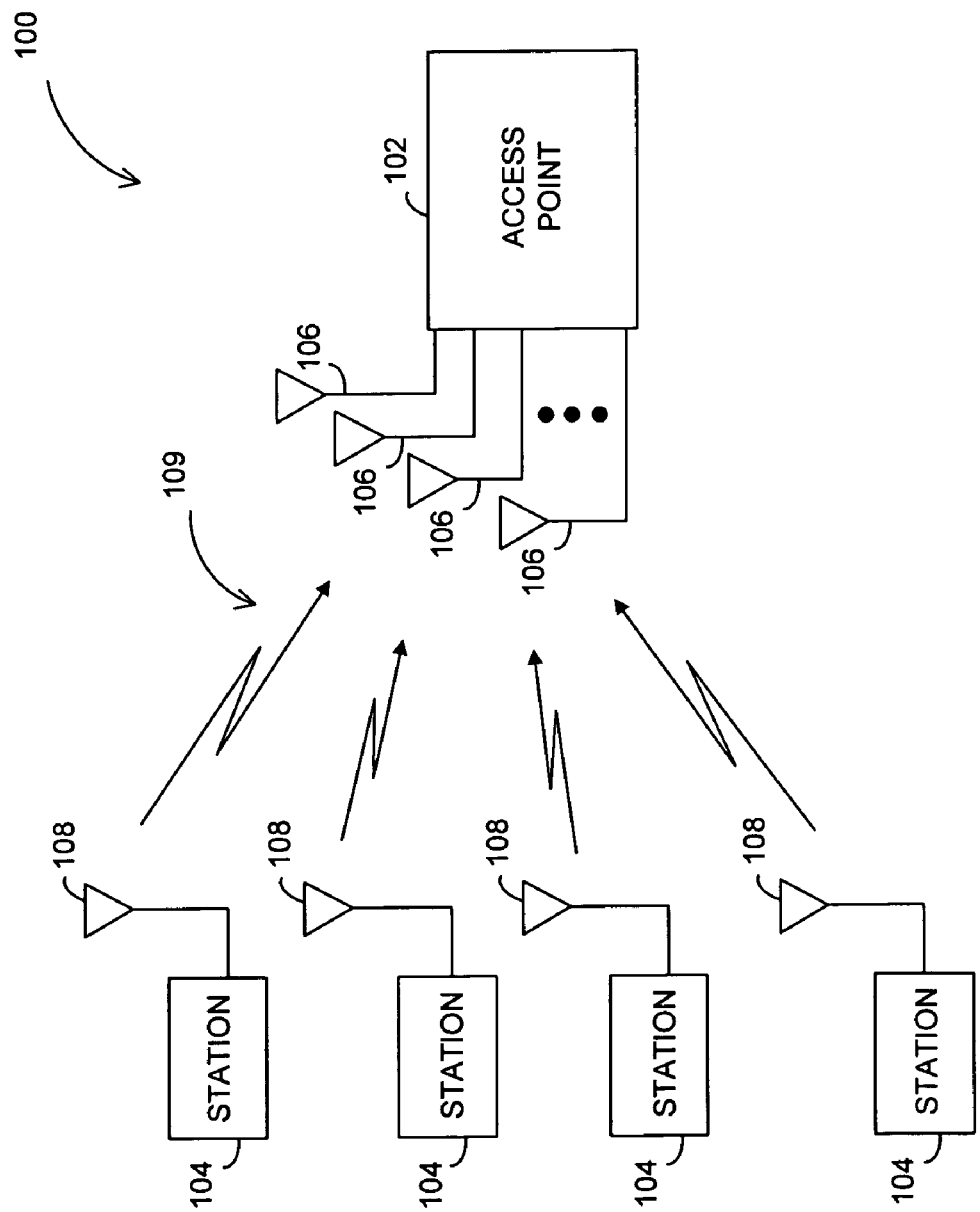
FIG. 4 is block diagram of a virtual MIMO wireless network, according to some embodiments of the present invention.

Referring to FIG. 4, in some embodiments, a network 100 may be arranged in a virtual MIMO configuration, wherein the uplink communications utilize: (a) an access point 102 and (b) M transmitting stations 104 (M>1). In some embodiments, the access point 102 may have at least M antennas 106 and each station 104 having a single antenna 108, as shown in FIG. 4. In some embodiments, each station 104 may have multiple antennas and, if the access point 102 may have the same number or more than the total number of transmitting antennas, the access point 102 may resolve the different transmitted data streams. The M stations 104 may transmit (upload) simultaneously to the access point 102 over a wireless medium (communications link) 109, thereby defining a multi-user uplink between the M transmitting stations 104 and the access point 102. In order for the access point 102 to demodulate the received signals from the M stations 104, it may have M or more antennas 106, whereas each of the transmitting stations 104 may have only one antenna 108. In some embodiments, M may have a maximum value of 4. For example, there may be 4 single antenna stations, or 2 single antenna stations and one station with 2 antennas, or 1 single antenna station and one station with 3 antennas, with the total is M=4. In some embodiments, this virtual MIMO system may be referred to as a Simultaneous Coordinated Channel Access (SCCA) system.

In some embodiments, multiple single-antenna stations 104 may be polled simultaneously by the access point 102 with a poll frame and in response to the poll frame, the stations 104 may simultaneously uplink data packets by exploiting the spatial diversity arising from independent and uncorrelated fading. In a configuration where there are four stations 104 (M=4), each of the transmitting stations 104 may start their transmission with a SCCA preamble, which may be partitioned into S1, S2, S3, S4 (S-sequences), where each of the sequences corresponds to one of the four stations 104. The SCCA preamble also may include a training signal. In some embodiments, the SCCA preamble may include long and short frequency-interleaved orthogonal training signals. In some embodiments, each transmitting station 104 may use part of a standard preamble, such as an IEEE 802.11n preamble (IEEE 802.11n identified hereinafter). The training signals from the polled transmitting stations 104 are concurrently transmitted to the access point 102.

The access point 102, with its multi-antenna capability, may resolve the spatial streams corresponding to the M multi-user uplinked stations 104. More specifically, the access point 102 may internally separate the uplink data transmitted by the M associated transmitting stations 104 using channel estimates for each associated transmitting station 104 from which a transmission is received. In some embodiments, access point 102 may take advantage of the antenna diversity resulting from differently located associated transmitting stations 104.

A receiver, configured for use in the access point 102 and capable of handling multiple stations 104 transmitting at the same time, is presented hereinafter in FIG. 5. On the other end of the wireless medium 109, each of the stations 104 may include the receiver 10 of FIG. 1 to receive communications from the access point 102. Although two-way communications may be undertaken by a transceiver of the access point 102, the discussion hereinafter with respect to FIG. 5 will focus on the receiver part of the transceiver in the access point 102, with the virtual MIMO network 100 configured so that the stations 104 act as transmitting stations and the access point 102 acts as a receiving station. The basic MIMO receiver for use in the network 80 of FIG. 3 may be similar to the receiver of FIG. 5 for a virtual MIMO, except there may be differences in the signal processing algorithms.

Figure 5:
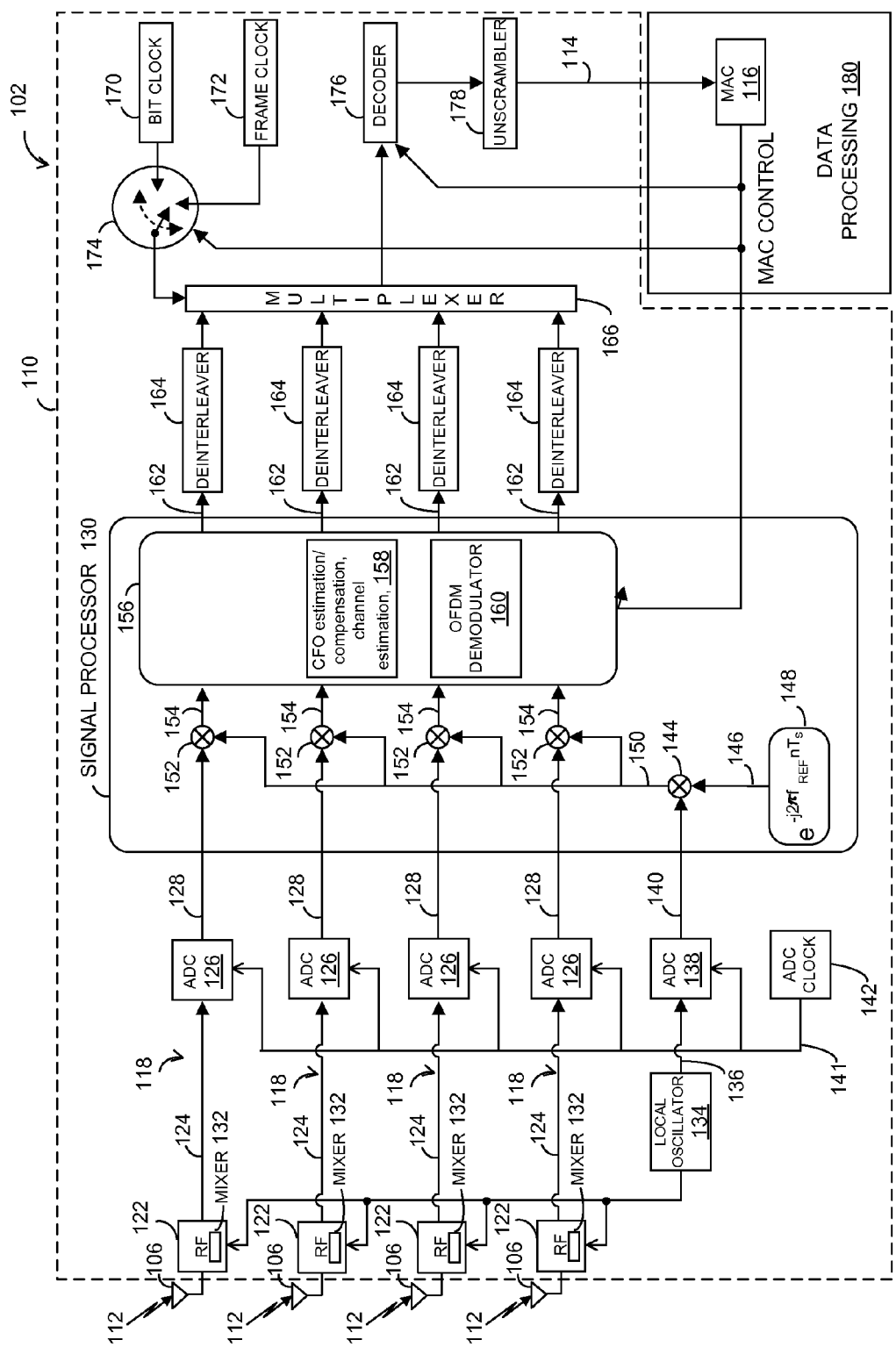
FIG. 5 is a block diagram of a multicarrier receiver for an access point shown in FIG. 4, according to some embodiments of the present invention.

With respect to the virtual MIMO embodiment, the receiver of FIG. 5 may reduce or cancel phase noise essentially in the same manner as described with respect to the receiver 10 of FIG. 1. However, unlike the SISO and basic MIMO systems of FIG. 3 which have previously been described as having one CFO estimate and correction, there would be M different CFO estimates and corrections in the virtual MIMO embodiment. Slight differences between transmission frequencies of the transmitting stations 104 generate the M different CFOs. Hence, with a virtual MIMO system, the CFO correction by adjusting the reference frequency $f_{REF}$ would not be possible. In other words, phase noise and CFO correction may be combined in the SISO and the basic MIMO embodiments by adjusting the reference frequency $f_{REF}$, but not in the virtual MIMO embodiments where only phase noise correction may be undertaken by the use of the reference frequency $f_{REF}$. Consequently, an alternative and separate CFO estimation and correction approach may be used in the virtual MIMO system, with several such CFO estimation and correction approaches being available.

Referring to FIG. 5, a receiver 110 for the access point 102 of FIG. 4 is illustrated. The receiver 110 may receive multi-carrier communication signals 112, such as an OFDM signals, with the receiver 110 being capable of receiving one of the multicarrier communication signal 112 from each of the transmitting stations 104 of FIG. 4. The receiver 110 illustrates circuitry of a portion of the access point 102 referred to as the physical (PHY) layer. At its output, the receiver 110 may generate PHY layer output data 114 for media access control (MAC) layer 116. The receiver 110 may have a plurality of receive-signal paths 118. In some embodiments, each of the receive-signal paths 118 may include a receive antenna 106 to receive communication signal 112 from one of the associated transmitting stations 104 of FIG. 4, radio-frequency (RF) receiver circuitry 122 associated with each of antenna 106 to generate an analog baseband signal 124, and analog-to-digital converter (ADC) 126 (also referred to as sampler) to generate a digital baseband signal 128 associated with each receive antenna 106. The receive signal paths 118 extend into the functions of a signal processor 130, as will be described hereinafter. In some embodiments, the RF circuitry 122, like the RF circuitry 29 of FIG. 1, may include a front-end circuit, a mixer 132, and an IF filter, with only the mixer 132 being shown in FIG. 5.

The mixers 132 of the receive-signal paths 118 are coupled to the front-end circuitry (not shown) to receive the received multicarrier communication signal and coupled to a common down-converter local oscillator (LO) 134 to receive an oscillator signal 136. In some embodiments, the oscillator 134 may be a voltage controlled oscillator (VCO). Each of the mixers 132 may use the oscillator signal 136 to down-convert the received multicarrier communication signal from the front-end circuitry to the baseband signals 124.

The receiver 110, according to one embodiment of the present invention, includes, in addition to the ADCs 126 (also referred to as "samplers"), an ADC 138 coupled to the oscillator 134 to receive the oscillator signal 136. The ADCs 126 and 138 sample the baseband signals 124 and the oscillator signal 136 at the same sampling times, to generate the digital baseband signal 128 and a digital oscillator signal 140, respectively. The ADCs 126 and 138 use a common clock signal 141 from a clock source 142 for their sampling. The signal processor 130 may be coupled to the ADCs 126 and 138 to receive the digital signals 128 and 140.

The signal processor 130 may include an operator 144, such as a multiplier, to combine (derotate) the digital oscillator signal 140 with a reference signal 146 from a reference signal source 148 to provide a phase noise signal 150. The reference signal 146 is based upon an approximated or estimated frequency of the oscillator 134, which is referred to as the frequency $f_{REF}$. The signal processor 130 may include a plurality of operator 152, such as multipliers, that form part of the signal-receive paths 118. The operators 152 may be used for derotating the digital baseband signals 128 by the phase noise signal 150 to produce a plurality of phase noise reduced signals 154.

The receiver 110, according to one embodiment of the present invention, includes an ICI and CPE cancellation technique for receiver phase noise caused by the oscillator 134, with this cancellation technique substantially reducing or canceling this phase noise in time domain. More specifically, this cancellation technique involves sampling the oscillator signal 136 of the oscillator 134 at precisely the same instants as the baseband signals 124 are sampled. For example, in one embodiment, this sampling rate would be 20 MHz. The digital oscillator signal 140 samples have been rotated by the local oscillator's frequency and therefore contain the same phase variation due to the phase noise that affects the digital baseband signal 128. The digital oscillator signal 140 samples are then processed by derotating them at the operator 144 by the reference signal 146, which may have an approximated or estimated value of the frequency of the oscillator 134. The phase variation due to the phase noise of the oscillator 134 is still contained in the digital baseband signal 128 samples and once extracted as the phase noise signal 150, may be used to cancel the phase noise in the digital baseband signal 128 samples; thereby substantially reducing or removing the effects of the phase noise introduced by the oscillator 134 at the receiver 110.

The signal processor 130 may perform a number of other functions, as shown in the block 156. The signal processor 130 may also perform carrier frequency offset (CFO) estimation and channel estimation 158. In some embodiments, signal processor 130 may generate channel estimates and CFO estimates for each of the transmitting stations 104 of FIG. 4 from the received training signals. In some embodiments, the receiver 110 may receive the long and short frequency-interleaved orthogonal training signals that were concurrently transmitted from transmitting stations 104 of FIG. 4. Estimated channel coefficients corresponding to each transmitting station 104 may be used to extract data pertaining to that station 104. Estimated CFOs may be incorporated into transmitted signals prior to transmission to correct for the CFOs. In some embodiments, the signal processor 130 may generate channel estimates and carrier frequency offset (CFO) estimates for each of the transmitting stations 104 from the received training signals by performing an iterative decoding process using previously generated channel estimates and previously generated CFO estimates. The receiver 110 may have an equal or greater number of antennas 106 than the number of selected transmitting stations 104 of FIG. 4 to resolve the spatial streams transmitted by each transmitting station 104.

The signal processor 130 may include demodulators 160 which may perform a fast Fourier transform on the phase noise reduced signals 154 to generate demodulated signals. In some embodiments, the demodulators 160 may comprise OFDM demodulators. The demodulated signals may include a frequency-domain signal for each subcarrier of the received multicarrier signal.

The signal processor 130 may also perform equalization and may demap constellations to frequency-domain symbols for each subcarrier to generate a data stream 162 associated with each transmitting station 104 of FIG. 4.

Referring to FIGS. 4 and 5, in some embodiments, the receiver 110 may also include deinterleavers 164 to perform deinterleaving operations on bits of the data streams 162 and a multiplexer 166 to multiplex the bits from deinterleavers 164 to generate frames 168 based on boundary information provided by a bit clock 170 or a frame clock 172 based upon a switch 174. The receiver 110 may also include a decoder 176 to decode frames 168, and a descrambler 178 to unscramble the decoded frames to generate PHY layer output data 114. Data processing circuitry 180, like the receiver 110, may be part of the access point 102 of FIG. 4. The data processing circuitry may include MAC layer 116. The data processing circuitry 180 may select a predetermined number of transmitting stations 104 based on a number of receive antennas 106 available to receive communication signals from the transmitting stations 104 of FIG. 4 over a multi-user uplink. In some embodiments, receiver 110 may use up to four receive antennas 106 for receiving communication signals 112 from up to four associated transmitting stations. In some embodiments, the receiver 110 may use up to ten or more receive antennas 106 for receiving communication signals 112 from up to ten or more associated transmitting stations.

With reference to FIGS. 4 and 5, a detailed mathematical presentation of the receiver 110, according to one embodiment of the invention, is now provided. The receiver 110 represents a general case where M stations 104 are uplinking simultaneously to the access point 102 (M>1), which is the virtual MIMO embodiment described above. If $X_m(i)$ is the $i^{th}$ frequency domain OFDM symbol transmitted by the $m^{th}$ station, then the received signal $y_l(i)$ at the $i^{th}$ antenna 106 of the access point 102 will be:

$$y_l(i) = \sum_{m=1}^{M} C_m H_{l,m} Q^H X_m(i) + \eta_l \quad (6)$$

Where $C_m = \text{diag}(1, e^{j2\pi(f_{TXm}-f_{RX})(1)T_s} \ldots e^{j2\pi(f_{TXm}-f_{RX})(N-1)T_s})$ is the carrier frequency offset (CFO) matrix, $\eta_l$ and $Q^H$ represent the Additive White Gaussian Noise (AWGN) process at the $l^{th}$ antenna at the access point 102 and IDFT matrix, respectively, $H_{l,m}$ the circulant channel matrix between the $m^{th}$ transmission station 104 and the $l^{th}$ antenna 106 on the access point 102 and N is the total number of OFDM subcarriers.

Let $E_{RX}(i)$ be the time domain phase noise diagonal matrix introduced at the receiver 110, given as $\text{diag}(e^{j\phi(i,0)} e^{j\phi(i,1)} \ldots e^{j\phi(i,N-1)})$ for the $i^{th}$ symbol, $E_{TXm}(i)$ is the time domain phase noise diagonal matrix introduced at the $m^{th}$ transmitter 104 given as $\text{diag}(e^{j\theta_m(i,0)} e^{j\theta_m(i,1)} \ldots e^{j\theta_m(i,N-1)})$ for the $i^{th}$ symbol, and $\phi(i,n)$ and $\theta_m(i,n)$, $n=0, 2, \ldots, N-1$ are real sampled random variables and represent the phase noise (PN) process at the receiver 110 and transmitters 104 respectively.

The following is defined:

$$r_{TXm} = \text{diag}(1, e^{j2\pi f_{TXm}(1)T_s} \ldots e^{j2\pi f_{TXm}(N-1)T_s})$$

$r_{RX} = \text{diag}(1, e^{j2\pi f_{RX}(1)T_s} \ldots e^{j2\pi f_{RX}(N-1)T_s})$ where $f_{TXm}$ and $f_{RX}$ are the phase noise free local RF oscillator frequencies of the $m^{th}$ transmitting station and the receiver station respectively.

Neglecting the symbol index i, the phase noise plagued receiver oscillator 134 may be written as:

$$r'_{RX} = r_{RX} E_{RX} \quad (7)$$

$$r'_{RX} = \text{diag}(e^{j\phi(0)} e^{j(2\pi f_{RX}(1)T_s + \phi(1))} \ldots e^{j(2\pi f_{RX}(N-1)T_s + \phi(N-1))}) \quad (8)$$

Similarly, $$r'_{TXm} = r_{TXm} E_{TXm} \quad (9)$$

$$r'_{TXm} = \text{diag}(e^{j\theta_m(0)} e^{j(2\pi f_{TXm}(1)T_s + \theta_m(1))} \ldots e^{j(2\pi f_{TXm}(N-1)T_s + \theta_m(N-1))}) \quad (10)$$

Hence, after down conversion by the mixer 132, $$C_m = r'_{TXm} r'_{RX}{}^H \quad (11)$$

$$C_m = r'_{TXm} E_{RX}{}^H r_{RX}{}^H \quad (12)$$

Sampling the local oscillator signal 136 using the same clock 142 used to sample the down converted baseband signal 124 and rotating these samples by $f_{REF} \approx f_{RX}$, the following is obtained $z = r'_{RX} r_{REF}{}^H$ where, $r_{REF} = \text{diag}(1, e^{j2\pi f_{REF}(1)T_s} \ldots e^{j2\pi f_{REF}(N-1)T_s})$. Therefore, $$zy_l = z \sum_{m=1}^{M} C_m H_{l,m} Q^H X_m + \eta_l \quad (13)$$

$$zy_l = r'_{RX} r_{REF}{}^H \sum_{m=1}^{M} r'_{TXm} E_{RX}{}^H r_{RX}{}^H H_{l,m} Q^H X_m + \eta_l \quad (14)$$

$$zy_l = r_{RX} E_{RX} r_{REF}{}^H E_{RX}{}^H r_{RX}{}^H \sum_{m=1}^{M} r'_{TXm} H_{l,m} Q^H X_m + \eta_l \quad (15)$$

As $r_{RX}, E_{RX}, r_{REF}{}^H, E_{RX}{}^H, r_{RX}{}^H$ and $r'_{TXm}$ are diagonal matrices, they may be rearranged as:

$$zy_l = r_{REF}^H (r_{RX} r_{RX}^H)(E_{RX} E_{RX}^H) \sum_{m=l}^{M} r'_{TXm} H_{l,m} Q^H X_m + \eta_l \quad (16)$$

$$zy_l = \sum_{m=l}^{M} r'_{TXm} r_{REF}^H H_{l,m} Q^H X_m + \eta_l \quad (17)$$

$$zy_l = \sum_{m=1}^{M} C'_m H_{l,m} Q^H X_m + \eta_l \quad (18)$$

Where $C'_m = r'_{TXm} r_{REF}^H = \text{diag}(1, e^{j2\pi(f_{TXm}-f_{REF})(1)T_s} \ldots e^{j2\pi(f_{TXm}-f_{REF})(N-1)T_s})$ which does not contain any phase noise effects from the receiver 110 and can be estimated and corrected for by normal CFO estimation and correction algorithms.

When the amplitude of the phase noise is small, the first order approximation can be used; $E_{RX}(i) = \text{diag}(1+j\phi(i,0)\, 1+j\phi(i,1) \ldots 1+j\phi(i,N-1))$ Thus $E_{RX}(i) = I_N + j\phi(i)$, where $\phi(i) = \text{diag}(\phi(i,0)\, \phi(i,1) \ldots \phi(i,N-1))$ and $E_{TXm}(i) = I_N + j\,\theta_m(i)$, where $\theta_m(i) = \text{diag}(\theta_m(i,0)\, \theta_m(i,1) \ldots \theta_m(i,N-1))$ After channel equalization and resolving the M data streams, the $i^{th}$ received symbol transmitted by the $m^{th}$ station will be, $$X'_m(i) = X_m(i) + jf_{0,m}(i)X_m(i) + jg_0(i)X_m(i) - g_0(i)f_{0,m}(i)X_m(i) + X_{ICI,m}(i) \quad (19)$$

Where if $G(i) = Q\phi(i)Q^H$ and $F_m(i) = Q\theta_m(i)Q^H$ are circulant matrices as $\phi(i)$ and $\theta_m(i)$ are diagonal then, $$G(i) = \begin{pmatrix} g_0(i) & g_{-1}(i) & \cdots & g_{-(N-1)}(i) \\ g_1(i) & g_0(i) & \cdots & g_{-(N-2)}(i) \\ \vdots & \vdots & \ddots & \vdots \\ g_{N-1}(i) & g_{N-2}(i) & \cdots & g_0(i) \end{pmatrix} \quad (20)$$

$$F_m(i) = \begin{pmatrix} f_{0,m}(i) & f_{-1,m}(i) & \cdots & f_{-(N-1),m}(i) \\ f_{1,m}(i) & f_{0,m}(i) & \cdots & f_{-(N-2),m}(i) \\ \vdots & \vdots & \ddots & \vdots \\ f_{(N-1),m}(i) & f_{(N-2),m}(i) & \cdots & f_{0,m}(i) \end{pmatrix} \quad (21)$$

Where $$g_0(i) = \frac{1}{N}\sum_{n=0}^{N-1} \phi(i,n) \text{ and } f_{0,m}(i) = \frac{1}{N}\sum_{n=0}^{N-1}\theta_m(i,n)$$

are the CPE of the receiver 110 and $m^{th}$ transmitter phase noise processes respectively.

By use of this invention, the demodulated QFDM symbol reduces to, $$X'_m(i) = X_m(i) + jf_{0,m}(i)X_m(i) + X_{ICI,m}(i) \quad (22)$$

The reduction in the error in the demodulated symbol is obvious from equations (19) and (22). It can also be seen from equation (22) that the CPE due to the phase noise process at the receiver station is also compensated for by this algorithm. The CPE $f_{0,m}(i)$ due to the phase noise process at the transmitters may be compensated for with existing methods.

By defining $QH_{l,m}Q^H = D_{l,m}$ and $H_{l,m} = Q^H D_{l,m} Q$, and by writing $G(i) = G_D(i) + G_{ND}(i)$ and $F_m(i) = F_{D,m}(i) + F_{ND,m}(i)$ where, $$G_D(i) = \text{diag}(g_0(i)g_0(i) \ldots g_0(i)) = g_0(i)I_N \quad (23)$$

and $$F_{D,M}(i) = \text{diag}(f_{0,m}(i)f_{0,m}(i) \ldots f_{0,m}(i)) = f_{0,m}(i)I_N \quad (24)$$

$G_{ND}(i)$ and $F_{NDm}(i)$ comprises of all the non-diagonal elements of $G(i)$ and $F_m(i)$ respectively and represents the ICI affecting the subcarriers, it may be shown that the ICI component reduces from, $$X_{ICI,m}(i) = jG_{ND}(i)X_m(i) + jD_{l,m}^{-1}F_{ND,m}(i)D_{l,m}X_m(i) \\ - f_{0,m}(i)G_{ND}(i)X_m(i) - D_{1,m}^{-1}F_{ND,m}(i)D_{1,m}g_0(i)X_m(i) \\ - D_{1,m}^{-1}F_{ND,m}(i)D_{1,m}G_{ND}(i)X_m(i) \quad (25)$$

To $$X_{ICI,m}(i) = jD_{1,m}^{-1}F_{ND,m}(i)D_{1,m}X_m(i) \quad (26)$$

The above CFO correction may be extended to SISO and basic MIMO (where only one CFO is involved) systems, as shown in FIG. 1. By replacing $f_{REF}$ with $f_{REF}$+CFO_estimate, it is possible to compensate for CFO in SISO and basic MIMO systems. Once the carrier frequency offset matrix C' has been estimated $\hat{C}'$ from the preamble using known CFO estimation algorithms, we define $r_{REF} = r'_{REF}$, where $r'_{REF} = r_{REF}\hat{C}'$. The antenna indices m and l are neglected as M=1. Then replacing $r_{REF}$ with $R'_{REF}$, equation (17) becomes:

$$zy = r'_{TX}r'_{REF}{}^H H Q^H X + \eta \quad (27)$$

$$zy = r'_{TX}\hat{C}'^H r_{REF}{}^H H Q^H X + \eta \quad (28)$$

$$zy = r'_{TX}r_{REF}{}^H \hat{C}'^H H Q^H X + \eta \quad (29)$$

From equation (18), $$zy = C'\hat{C}'^H H Q^H X + \eta \quad (30)$$

Assuming $C'\hat{C}'^H \approx I_N$, where $I_N$ is the unit matrix of dimension N, $$zy = H Q^H X + \eta \quad (31)$$

Hence, the above described phase noise cancellation algorithm may also accommodate carrier frequency offset correction in SISO and basic MIMO systems.

In some embodiments, the receivers 10 and 110 of FIGS. 1 and 5, respectively, may receive from an OFDM communication signal over a multicarrier communications channel (e.g., wideband channel). The communications channel may include one or more subchannels. The subchannels may be frequency-division multiplexed (i.e., separated in frequency) and may be within a predetermined frequency spectrum. The subchannels may include a plurality of orthogonal subcarriers. In some embodiments, the orthogonal subcarriers of a subchannel may be closely spaced OFDM subcarriers. To achieve orthogonality between closely spaced subcarriers, in these embodiments, the subcarriers of a particular subchannel may have a null at substantially a center frequency of the other subcarriers of that subchannel.

In some embodiments, the frequency spectrums for a wideband channel may comprise subchannels in either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz; however, other frequency spectrums are also equally suitable. In some broadband embodiments, the frequency spectrum for communications may comprise frequencies between 2 and 11 GHz.

In some embodiments, the receivers 10 and 110 of FIGS. 1 and 5 may receive symbol-modulated subcarriers in accordance with individual subcarrier modulation assignments. This may be referred to as adaptive bit loading (ABL). Accordingly, one or more bits may be represented by a symbol modulated on a subcarrier. The modulation assignments for the individual subchannels may be based on the channel characteristics or channel conditions for that subcarrier. In some embodiments, the subcarrier modulation assignments may range from zero bits per symbol to up to ten or more bits per symbol. In terms of modulation levels, the subcarrier modulation assignments may comprise binary phase shift keying (BPSK), which communicates one bit per symbol, quadrature phase shift keying (QPSK), which communicates two bits per symbol, 8 PSK, which communicates three bits per symbol, 16-quadrature amplitude modulation (16-QAM), which communicates four bits per symbol, 32-QAM, which communicates five bits per symbol, 64-QAM, which communicates six bits per symbol, 128-QAM, which communicates seven bits per symbol, and 256-QAM, which communicates eight bits per symbol. Modulation orders with higher data communication rates per subcarrier may also be used.

An OFDM symbol may be viewed as the combination of the symbols modulated on the individual subcarriers. Because of the variable number of bits per symbol-modulated subcarrier and the variable number of subchannels that may comprise a wideband channel, the number of bits per OFDM symbol received by the receivers may vary greatly. For example, in some embodiments, the receivers may receive over a wideband channel that may include up to four or more subchannels having bandwidths of approximately 20 MHz, and each of the subchannels may have up to 48 or more orthogonal data subcarriers having a spacing therebetween of approximately 312.5 kHz. In other embodiments, the receivers may receive an OFDM symbol over a single subchannel.

In some embodiments, the receivers 10 and 110 of FIGS. 1 and 5 may receive OFDMA communication signals. OFDMA is a multiple access scheme based on the OFDM method as described above includes the OFDMA method, which allows some of the subcarriers to be assigned to a predetermined terminal and the assigned subcarriers to be used. The OFDMA method does not require a spreading sequence for band spreading and may dynamically change a set of subcarriers, which are assigned to a predetermined terminal, according to a fading characteristic of a wireless transmission line. The dynamic changing of a set of subcarriers assigned to a predetermined terminal is called a dynamic resource allocation and may include frequency hopping.

Referring to FIG. 1, in some embodiments, the receiver 10 may be part of a portable communications device, such as a personal digital assistant (PDA), a laptop or portable computer with wireless communication capability, a web tablet, a wireless telephone, a wireless headset, a pager, an instant messaging device, a digital camera, an access point or other device that may receive and/or transmit information wirelessly.

In some embodiments, the receiver 10 and associated transmitter may receive radio-frequency communications in accordance with specific communication standards, such as the Institute of Electrical and Electronics Engineers (IEEE) standards, including the 802.11n standard for basic MIMOs, although the receivers may also be suitable to receive communications in accordance with other techniques. The IEEE 802.11 standard (initially published 1999, IEEE Standards Board, Piscataway, N.Y.) and later versions and amendments (collectively "IEEE 802.11"), define aspects of Wireless Local Area Networks (WLANs). References to IEEE 802.11n standard refer to the draft version published on or about January, 2006.

In these embodiments employing the receivers 10 or 110 of FIGS. 1 and 5, latency may be reduced for applications operating on selected associated stations. The applications may include time-sensitive applications, such as voice over IP (VOIP) or streamed video applications, which may have time sensitive packet transmission requirements. In some embodiments, the applications may have quality-of-service (QOS) level requirements. Quality-of-service level requirements may include data rate requirements, error rate requirements and/or packet priority requirements. In some embodiments, the quality-of-service level requirements may be based on the information content of the communications. The applications may also include less time-sensitive applications, such as applications that communicate best-effort traffic as well as background traffic. Other embodiments may not involve reducing latency for time-sensitive applications, in that some application may be equally applicable to almost any communication application operating on a station.

Referring to FIGS. 3 and 4, in some embodiments, the access point 86 or 102, respectively, may be a Wireless Fidelity (WiFi), Worldwide interoperability for Microwave Access (WiMax), or broadband communication station, although the access point may be almost any communication station. In some embodiments, stations 82 or 104 may be WiFi, WiMax, or broadband communication stations, although other types of stations are possible.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Some embodiments of the present invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing information in a form readable by a machine (e.g., a computer). For example, a machine-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. In the foregoing detailed description, various features may be occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. An apparatus, comprising:
a first sampler to generate a digital oscillator signal based at least in part on an analog oscillator signal;
a second sampler to generate a digital baseband signal based at least in part on an analog baseband signal, with the analog baseband signal having been outputted based at least in part on a multicarrier communication signal; and
a signal processor, coupled to the first and the second samplers, to generate a phase noise signal by removing a reference signal from the digital oscillator signal and to remove or reduce phase noise from the digital baseband signal based at least in part on the phase noise signal, with the reference signal being based in part on an estimated frequency for the analog oscillator signal, wherein the signal processor includes a reference signal source configured to generate the reference signal and to adjust the reference signal with a carrier frequency offset estimate.

2. The apparatus according to claim 1, wherein the first and the second samplers further base the respective generations of the digital oscillator signal and the digital baseband signal on a common clock signal, and the apparatus further comprising:
a clock, coupled to the first and the second samplers, to provide the common clock signal.

3. The apparatus according to claim 1, wherein the signal processor includes:
a first operator, coupled to the first sampler and the reference source, to derotate the digital oscillator signal with the reference signal to generate the phase noise signal; and
a second operator, coupled to the second sampler and the first operator, to derotate the digital baseband signal with the phase noise signal to generate the phase noise reduced digital baseband signal.

4. The apparatus according to claim 1, wherein the carrier frequency offset estimate is a function of a frequency difference between the oscillator signal and the reference signal.

5. The apparatus according to claim 1, wherein the signal processor includes
a first multiplier coupled to the first sampler to derotate the digital oscillator signal with the reference signal to generate the phase noise signal; and
a second multiplier coupled to the second sampler and the first multiplier, to derotate the digital baseband signal with the phase noise signal to generate the phase noise reduced digital baseband signal.

6. The apparatus according to claim 1, further comprising:
a clock, coupled to the first and the second samplers, to provide the common clock signal, with the first and the second samplers being configured to generate the digital oscillator signal and the digital baseband signal, respectively, based in part on the common clock signal;
an oscillator to generate the analog oscillator signal; and
a mixer, coupled to the oscillator and the second sampler, to generate the analog baseband signal based at least in part on the multicarrier communication signal and the analog oscillator signal.

7. The apparatus according to claim 6, further comprising:
a front-end circuit, coupled to the mixer, to provide the multicarrier communication signal; and
a demodulator to generate a demodulated signal based at least in part on the phase noise reduced digital baseband signal.

8. The apparatus according to claim 1, further comprising:
at least one other second sampler to generate at least one other digital baseband signal in response to at least one other analog baseband signal; and
the signal processor is further coupled to the at least one other second sampler to remove or reduce phase noise from the at least one other digital baseband signal based at least in part on the phase noise signal.

9. The apparatus according to claim 8, wherein the apparatus is a spatial multiplexing multiple-input, multiple-output receiver.

10. The apparatus according to claim 8, wherein the apparatus is a virtual multiple-input, multiple-output receiver.

11. The apparatus according to claim 1, wherein the multicarrier communication signal is an orthogonal frequency-division multiplexing signal.

12. A method, comprising:
down converting, in a mixer, a received multicarrier communication signal by combining the received multicarrier communication signal with an oscillator signal to generate a baseband signal;
generating, by a signal processor, a phase noise signal by removing a reference signal from the oscillator signal, with the reference signal including an estimated frequency for the oscillator signal;
adjusting, by the signal processor, the reference signal with a carrier frequency offset estimate; and
removing or reducing phase noise from the baseband signal to generate a phase noise reduced baseband signal based at least in part on the phase noise signal.

13. The method according to claim 12, further comprising:
sampling the oscillator signal with a first sampler responsive to a clock signal to generate a digital oscillator signal; and
sampling the baseband signal with a second sampler responsive to the clock signal to generate a digital baseband signal.

14. The method according to claim 13, wherein the generating of the phase noise signal by removing the reference signal from the oscillator signal includes
providing the reference signal in a signal processor; and
combining the digital oscillator signal with the reference signal in the signal processor to generate the phase noise signal.

15. The method according to claim 12, wherein the carrier frequency offset estimate is a function of a frequency difference between the oscillator signal and the reference signal.

16. The method according to claim 12, wherein the received multicarrier communication signal is an orthogonal frequency-division multiplexing signal.

17. The method according to claim 13, further comprising:
generating the clock signal to the first and the second samplers from a common clock source;
generating the oscillator signal with an oscillator; and
demodulating the phase noise reduced digital baseband signal.

18. A system, comprising:
at least one omnidirectional antenna to receive a multicarrier communication signal;
an oscillator to generate an analog oscillator signal;
a mixer, coupled to the antenna and the oscillator, to generate an analog baseband signal in response to the multicarrier communication signal and the analog oscillator signal;

a clock to generate a clock signal;
a first sampler, coupled the oscillator and the clock, to generate a digital oscillator signal in response to the analog oscillator signal and the clock signal;
a second sampler, coupled the mixer and the clock, to generate a digital baseband signal in response to the analog baseband signal and the clock signal; and
a signal processor, coupled to the first and the second samplers, to generate a phase noise signal by removing a reference signal from the digital oscillator signal and to remove or reduce phase noise from the digital baseband signal based at least in part on the phase noise signal, with the reference signal being a function of an estimated frequency for the oscillator signal, wherein the signal processor includes a reference signal source configured to generate the reference signal and to adjust the reference signal with a carrier frequency offset estimate.

19. The system according to claim 18, wherein the signal processor includes:
a first operator, coupled to the first sampler and the reference signal source, to derotate the digital oscillator signal with the reference signal to generate the phase noise signal; and
a second operator, coupled to the second sampler and the first operator, to derotate the digital baseband signal with the phase noise signal to generate the phase noise reduced signal.

20. The system according to claim 18, wherein the carrier frequency offset estimate being a function of a frequency difference between the digital oscillator signal and the reference signal.

21. The system according to claim 18, wherein the signal processor includes
a first multiplier coupled to the first sampler to derotate the digital oscillator signal with the reference signal to generate the phase noise signal, and
a second multiplier coupled to the second sampler and the first multiplier, to derotate the digital baseband signal with the phase noise signal to generate the phase noise reduced digital baseband signal.

22. The system according to claim 18, further comprising a front-end circuit, coupled to the mixer, to provide the multicarrier communication signal.

23. The system according to claim 18, wherein the system further comprises:
at least one other mixer, coupled to the oscillator, to generate at least one other analog baseband signal in response to the analog oscillator signal and at least one other multicarrier communication signal;
at least one other second sampler, coupled to the at least one other mixer, to generate at least one other digital baseband signal in response to the at least one other analog baseband signal and the clock signal;
wherein the signal processor is coupled to the at least one other second sampler to remove or reduce the phase noise signal from the at least one other digital baseband signal; and
wherein the system further comprises a transmitting station to transmit the plurality of multicarrier communication signals over a wireless medium to the plurality of mixers.

24. The system according to claim 18, wherein the system further comprises
at least one other mixer, coupled to the oscillator, to generate at least one other analog baseband signals in response to the analog oscillator signal and at least one other multicarrier communication signals; and
at least one other second sampler, coupled to the at least one other mixer, to generate at least one other digital baseband signal in response to the at least one other analog baseband signal and the clock signal;
wherein the signal processor is coupled to the plurality of second samplers to remove or reduce phase noise from the plurality of digital baseband signals based on the phase noise signal; and
wherein the system further comprises a plurality of transmitting station, with each transmitting station transmitting one of the plurality of multicarrier communication signals over a wireless medium to one of the plurality of mixers.

25. The system according to claim 18, wherein the multicarrier communication signal is an orthogonal frequency-division multiplexing signal.

26. A machine-accessible medium that provides instructions, which when executed, enable a machine to perform operations comprising:
receiving a baseband signal and an oscillator signal;
generating a phase noise signal by removing a reference signal from the oscillator signal, with the reference signal including an estimated frequency for the oscillator signal;
adjusting the reference signal with a carrier frequency offset estimate; and
removing the phase noise signal from the baseband signal to generate a phase noise reduced baseband signal.

27. The machine-accessible medium according to claim 26, wherein the instructions, when executed, further enable the machine to perform a multiplication operation to derotate the oscillator signal with the reference signal to generate the phase noise signal.

28. The machine-accessible medium according to claim 27, wherein the instructions, when executed, further enable the machine to perform another multiplication operation to derotate the digital baseband signal with the phase noise signal to generate the phase noise reduced baseband signal.

29. The machine-accessible medium according to claim 28, wherein the carrier frequency offset estimate is a function of a frequency difference between the oscillator signal and the reference signal.

30. The machine-accessible medium according to claim 29, wherein the instructions, when executed, further enable the machine to perform an operation of:
demodulating the phase noise reduced baseband signal.

* * * * *

UNITED STATES PATENT AND TRADEMARK OFFICE
CERTIFICATE OF CORRECTION

PATENT NO. : 7,675,999 B2
APPLICATION NO. : 11/377958
DATED : March 9, 2010
INVENTOR(S) : Lawrence et al.

It is certified that error appears in the above-identified patent and that said Letters Patent is hereby corrected as shown below:

Column 15
Line 56, "...the common clock signal,..." should read --...a common clock signal,...--.

Column 16
Line 44, "...in a signal processor;..." should read --...in the signal processor;...--.

Column 17
Line 2, "...coupled the oscillator..." should read --..., coupled to the oscillator...--.

Column 17
Line 5, "...coupled the mixer..." should read --...coupled to the mixer...--.

Column 17
Line 30, "...offset estimate being a function..." should read --...offset estimate is function...--.

Column 18
Line 8, "...one other analog baseband signals..." should read --...one other analog baseband signal...--.

Column 18
Lines 9-10, "...at least one other multicarrier communication signals; and..." should read --...at least one other multicarrier communication signal; and...--.

Column 18
Lines 19-20, "...a plurality of transmitting station,..." should read --...a plurality of transmitting stations,...--.

Column 18
Line 27, "A machine-accessible medium..." should read --A machine-accessible storage medium...--.

Signed and Sealed this
Twenty-fourth Day of May, 2011

David J. Kappos
*Director of the United States Patent and Trademark Office*

CERTIFICATE OF CORRECTION (continued)
U.S. Pat. No. 7,675,999 B2

Column 18
Line 39, "The machine-accessible medium..." should read --The machine-accessible storage medium...--.

Column 18
Line 44, "The machine-accessible medium..." should read --The machine-accessible storage medium...--.

Column 18
Line 49, "The machine-accessible medium..." should read --The machine-accessible storage medium...--.

Column 18
Line 53, "The machine-accessible medium..." should read --The machine-accessible storage medium...--.